Oct. 1, 1940.   M. KLAVIK   2,216,669
AIR COOLING THE ENGINES OF REAR ENGINED AUTOMOBILES
Filed Dec. 20, 1938
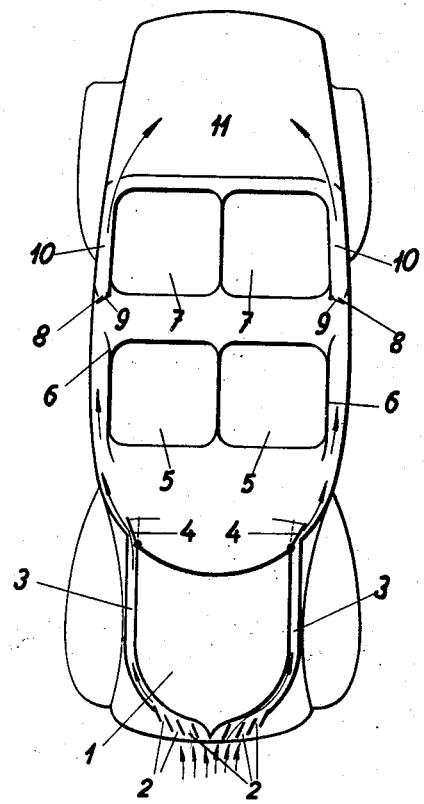
Inventor
Milos Klavik
By B. Singer, atty.

Patented Oct. 1, 1940

2,216,669

UNITED STATES PATENT OFFICE 2,216,669

AIR COOLING THE ENGINES OF REAR ENGINED AUTOMOBILES

Miloš Klavík, Prague, Czechoslovakia

Application December 20, 1938, Serial No. 246,912
In Czechoslovakia August 21, 1937

2 Claims. (Cl. 180—54)

In automobiles with an engine at the rear, in particular in vehicles with a streamlined body, where a considerable vacuum normally prevails around the rearward part of the vehicle in rapid travel, it is difficult to supply a sufficient quantity of cooling air to the engine, even though the latter is provided with very efficient fans or the like. For this purpose, various arrangements of cooling air inlets have already been proposed, from which the air is supplied through conduits to the engine situated in the rear part of the body. The higher the temperature of the outer air, particularly in hot summer weather, the more cooling air is necessary which however, in the case of streamlined body forms, all of which are closed, cannot be secured by simple means, such as for example by merely increasing the size of the inlets and the like.

According to the invention, these conditions prevailing in summer and in hot climates may be substantially removed by leading a part of the necessary cooling air directly through the interior of the body in such a manner that the cooling stream passing through the body flows past places where it inconveniences the passengers as little as possible, that is to say on the floor of the vehicle. At the same time the interior of the body is also substantially and effectively ventilated.

For this purpose, an appropriate number of air inlets are provided in the front part of the body where, when travelling at high speed, a considerable pressure prevails, and conduits starting on the inside from these inlets extend round the wings and supply the aspirated cooling air to flaps or doors mounted in the front wall of the body interior. By means of these flaps, the entrance of air to the passenger compartment may be regulated so that the air flows closely past the door of the body.

By leaving between the seats in the front part of the body interior and the door or the lower parts of the sides sufficient clear space, which if desired may be confined by a protective wall fixed to the seat itself, the cooling air passes through the interior of the body without thereby giving rise to any danger of disturbing the passengers. At the rear seats and likewise close to the sides, further passages are provided for the air, which if desired may be equipped with flaps and from which conduits lead to the engine compartment situated in the rear part of the body.

A constructional example of the invention is shown diagrammatically in plan in the accompanying drawing.

In the front part 1 of the vehicle body suction inlets 2 and conduits 3 are provided, through which the air is supplied to the regulating flaps 4. In the case of the front seats 5 guide-walls 6 are provided and in the case of the rear seats 7 inlets 8 with regulating flaps 9, are provided, from which conduits 10 lead to the engine compartment 11 in the rear of the body.

The construction shown in the drawing is only an example, and the leading of the air through the body may be effected in a different manner, for example through the front part of the vehicle or the like.

I claim:

1. In a rear engined automobile, front inlets and connecting conduits leading to the front wall of the body interior, the air stream continuing between the seats and doors close to the body sides, outlets from the interior of the body to the engine chamber through which outlets the air stream continues into the engine chamber, and flap-controlled means for the air arranged in the conduits where they enter the body interior and where the air passes between the rear seats and doors to said outlets to the engine chamber, whereby the interior of the body may be ventilated.

2. A rear engined automobile, comprising inlets for the cooling air at the front of the automobile and inlet conduits connected to said inlets and outlet conduits from the interior of the body to the engine chamber, said inlet conduits leading to the front wall of the body, the air stream continuing between the seats and doors close to the body sides and through the outlet conduits and into the engine chamber, and flap-controlled means for the air, said flap-controlled means being arranged where the inlet conduits enter the body interior and where the outlet conduits have their entrance in the body interior, whereby the interior of the body may be ventilated.

MILOŠ KLAVÍK.